United States Patent [19]

O'Sullivan et al.

[11] Patent Number: 5,774,242

[45] Date of Patent: Jun. 30, 1998

[54] EYE MASK FOR MEASUREMENT OF DISTORTION IN OPTICAL TRANSMISSION SYSTEMS

[75] Inventors: Maurice Stephen O'Sullivan; Rongqing Hui; Jingyu Zhou, all of Ottawa, Canada

[73] Assignee: Northern Telecom Limited, Montreal, Canada

[21] Appl. No.: 785,806

[22] Filed: Jan. 15, 1997

[30] Foreign Application Priority Data

May 28, 1996 [CA] Canada ................................. 2177925

[51] Int. Cl.$^6$ ............................................. H04B 10/08
[52] U.S. Cl. ......................................... 359/110; 371/20.1
[58] Field of Search ................................. 359/110, 161, 359/173, 177, 187; 371/20.1, 20.5; 356/73.1

[56] References Cited

U.S. PATENT DOCUMENTS 5,157,652 10/1992 Walker ..................................... 359/110
5,367,394 11/1994 Chuter et al. ............................ 359/110

OTHER PUBLICATIONS

ICC 91—Proceedings of the International Conference on Communications, vol. 1, 23–26 Jun. 1991, Denver (US), pp. 334–337, XP000269426 P. Gambini et al., "Impact of DFB–LD FM Response Distortion, in Amplitude and Phase, on FSK Coherent Systems".

Australian Electronics Engineering, vol. 27, No. 7, Jul. 1994, Australia, pp. 29–32, XP000646072, V. Prasannan et al., "On the Fast Track to Comms Testing".

Communications International, vol. 22, No. 6, Jun. 1995, United Kingdom, pp. 61–64, XP000646073, M. Lum, "Making 'Mid–Fibre Meet' a Reality".

Proceedings of the Optical Communication Conference, 17–19 Sep. 1979, Amsterdam (NL), pp. 19.9–1–19.9–4, XP000646119, A. Broslo et al., "Transmission Experiments at 34 MBIT/S on Optical Fibres with HBD 3 Line Code".

Electronics Letters, Vol. 32, No. 15, 18 Jul. 1996, Stevenage GB, pp.1399–1400, XP000647151 H. Takara et al., "Optical Signal Eye Diagram Measurement with Subpicosecond Resolution Using Optical Sampling".

*Primary Examiner*—Kinfe-Michael Negash
*Attorney, Agent, or Firm*—Aprilia U. Diaconescu

[57] ABSTRACT

A performance evaluation analysis for optical transmission systems is disclosed. A reference eye mask is defined for a transmitter and for a reference optical transmission link. The quality of the transmission for a live path is determined by applying the reference eye mask on the eye diagram of the electrical signal recovered at a point of measurement with a distortion measurement unit. The point of measurement could be established at a receiver optical connection plane, for measuring the optical transmission link and transmitter penalty, or could be at the optical connection plane of a transmitter, for measuring the performance of the transmitter. The optical path may include optical amplifiers, dispersion compensating modules, active and passive components.

20 Claims, 10 Drawing Sheets

EYE MASK FOR MEASUREMENT OF DISTORTION IN OPTICAL TRANSMISSION SYSTEMS

BACKGROUND OF THE INVENTION

1. Field of the Invention

The invention relates to a performance evaluation analysis for optical transmission systems, and more particularly to an eye mask method and device for measurement of distortions.

2. Background Art

Distortion is defined as any inaccurate reproduction of a generated signal which is referred to system elements placed anywhere in a transmission link. It can be measured by assessing the differences between the wave shape of the original signal and that of the signal after it has traversed the transmission link. Optical signals suffer degradation between the transmitter and receiver from such factors as noise, inter-symbol interference, fiber dispersion, etc.

Dispersion is the chromatic or wavelength dependence of a parameter, as for example the distortion caused by different wavelengths of light within the pulse traveling at different speeds. The pulse distortion in a fiber optic system may also be caused by some parts of the light pulses following longer paths (modes) than other parts.

In the last decade, transmission rates of data signals have increased progressively, which demand faster and more sensitive transmission systems. For high rate transmission, such as at 10 or 40 Gb/s, the dispersion of the optical link is a critical parameter. With the different types of dispersion shifted fiber, dispersion compensating fiber and dispersion compensating filters that make up a given link, determining the dispersion of a link is no longer the simple operation of multiplying the length of the fiber, in km, by the 17 ps/nm/km dispersion characteristic of the standard single-mode fiber.

Moreover, in optical transmission systems with in-line optical amplifiers, system performance degradation caused by noise and optical path distortions are usually inseparable, making the performance evaluation complicated.

In the absence of optical amplifiers or dispersion compensation, specification of STM-64 optical parameters can be a straightforward extension of G.957 using its existing framework. However, including effects of optical amplifiers and dispersion compensation within the G.957 framework is not straightforward. In particular, optical noise from amplifiers and distortions from the optical path in the presence of dispersion compensation and optical nonlinearities have to be controlled to allow for transverse compatibility.

The extent of signal degradation can be represented by an eye closure diagram, which is the graphic pattern produced on an oscilloscope when a baseband signal is applied to the vertical input of the oscilloscope and the symbol rate triggers the instrument time base. For a binary signal, such an eye diagram has a single eye which is open or closed to an extent determined by the signal degradation. An open pattern is desired. Changes in the eye size indicate intersymbol interference, amplitude irregularities, or timing problems, such as jitters, depending on the signal that is measured.

There are several test instruments available that measure distortion. For example, U.S. Pat. No. 4,823,360 (Tremblay et al., issued Apr. 18, 1989 and assigned to Northern Telecom Limited) discloses a device for measuring chromatic dispersion of an optical fiber based on a baseband phase comparison method. The device described in this U.S. patent evaluates the transmission link performance using three threshold levels for recovering data. Two of the thresholds are obtained by measuring the level of "long 0s" and "long 1s", respectively, for a preset error rate, and the third threshold is provided in a selected relationship to the other two.

U.S. Pat. No. 4,799,790 (Tsukamoto et al., issued Jan. 24, 1989 and assigned to Anritsu Corporation) discloses a device comprising a transmitter for launching signals of various wavelengths into a reference or a test fiber, and a receiver. At the receiver, the phase difference between two adjacent wavelengths is measured for both the reference and test path for determining the delay of the respective wavelength.

However, none of these U.S. patents is concerned with providing a worse case path distortion factor, irrespective of the noise characteristics, for separating the distortion budget from the noise budget.

SUMMARY OF THE INVENTION

It is an object of this invention to provide an improved method and device for measuring distortions along an optical path of a transmission system.

It is another object of this invention to provide a distortion measurement method and device which give a distortion factor for a reference length of single mode fiber for defining acceptable transmitter and link performance. The worst case distortion factor characterizes the transmission irrespective of the noise characteristics of the link, by separating the distortion budget from the noise budget.

According to this invention, there is provided a method for measuring distortion in an optical transmission system comprising the steps of transmitting an outgoing optical signal from a transmitter to a point of measurement defined downstream from the transmitter; receiving at a distortion measuring unit connected to the point of measurement an incoming optical signal which is a degraded variant of the outgoing optical signal; converting the incoming optical signal to an electrical signal, recovering a clock signal from the electrical signal; generating an eye diagram of the electrical signal; and measuring a distortion parameter on the eye diagram.

According to another aspect, there is provided a method for measuring distortion in an optical transmission system comprising the steps of defining a reference path which simulates an optical live path to be tested; launching an outgoing optical signal on the reference path from a test transmitter and receiving at a distortion measuring unit an incoming optical signal which is a degraded variant of the outgoing optical signal; converting the incoming optical signal to an electrical signal and recovering a clock signal from the electrical signal; selecting a sampling interval ($T_s$) to be relatively large in comparison with the interval (T) between two successive symbols of the electrical signal and repetitively processing the electrical signal during the sampling interval using the clock signal; establishing a reference eye diagram of the waveform and determining on the eye diagram a first power level ($P_1$) representing the level for the long "1"s, and a second power level representing the level for the long "0"s; determining on the eye diagram a lowest inner upper power level ($P_{iu}$) and a highest inner lower power level ($P_{il}$) for an admissible phase window (W) expressed in absolute time units; and determining an upper value (A) and a lower value (B), representing the normalized values for the ($P_{iu}$), and ($P_{il}$), respectively, with respect to the first and second power levels; preparing a reference eye mask as a rectangle with a first side representing the phase window (W) and a second side representing the difference between the upper value (A) and the lower value (B); and provisioning the reference eye mask at a point of measurement at the output of the live path.

According to yet another aspect, the invention provides a distortion measurement unit for measuring a performance parameter of an optical transmission link, comprising a converter for converting an incoming optical signal to a digital electrical signal; a clock recovery unit for recovering a clock signal from the digital electrical signal; a signal analyzer for receiving the digital electrical signal and the clock signal and producing a broadband analog waveform; a performance processor for receiving the broadband analog waveform, reforming same, and determining a distortion parameter for a preset phase window (W); a control unit for supervising the converter, the clock recovery unit, the signal analyzer and the performance processor.

According to still another aspect, the invention provides a device for measurement of distortion of an optical link comprising a test transmitter for generating a pseudo-random bit sequence of order 7 or higher; a reference path between the test transmitter and a point of measurement; and a distortion measurement unit for receiving an incoming optical signal which is a degraded variant of the pseudo-random bit sequence, converting the second optical signal to an analog broadband waveform, generating an eye diagram of the analog broadband waveform, and establishing a reference eye mask on the eye diagram.

A significant advantage of the method of this invention is that it can be used for determining the quality of transmission in more complex optical systems than the prior art permitted, in that the path analyzed may include optical amplifiers, dispersion compensating modules, active and passive optical components.

Another advantage of this invention is that it eliminates or reduces the need for high resolution spectral specifications such as rms source linewidth, chirp, and transmitter extinction ratio. All of the above parameters, together with the optical path penalty and other distortions can be controlled by eye mask parameters.

BRIEF DESCRIPTION OF THE DRAWINGS

The foregoing and other objects, features and advantages of the invention will be apparent from the following more particular description of the preferred embodiments, as illustrated in the appended drawings, where.

DESCRIPTION OF THE PREFERRED EMBODIMENT

Figure 1:
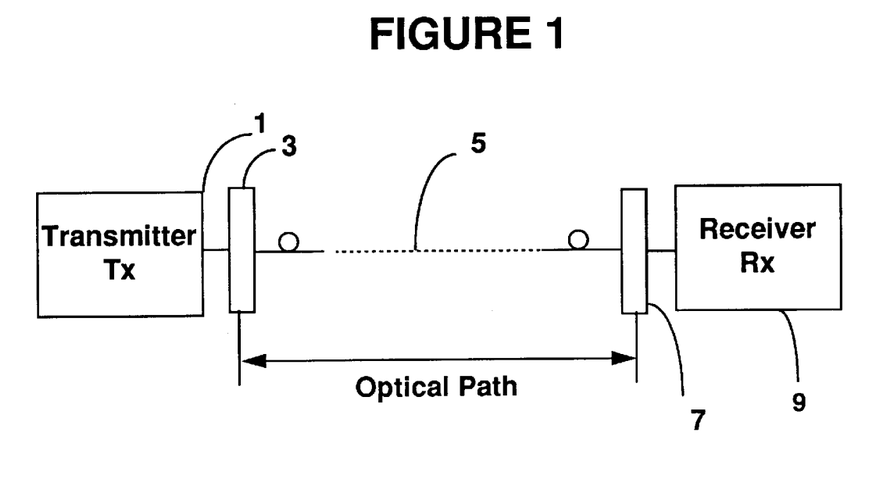
FIG. 1 is a specification model for the optical layer of a transmission system, illustrating the optical path.

FIG. 1 is a block diagram of the physical layer of the optical transmission link under consideration, including from left to right a transmitter source 1, a transmit interface 3, an optical path under evaluation (tested path) 5, a receiver interface 7, and a receiver 9. Interfaces 3 and 7 are located at the transmitter and receiver optical connection plane, respectively. The optical path is defined herein as the multitude of optical amplifiers, optical filters, dispersion compensating modules (DCM), and other active and passive optical components such as optical connectors, patch cords, cabled fiber, etc, which may be deployed between transmitter interface 3 and receiver interface 7.

The measurement according to the invention is effected at the transmitter interface 3, for measuring the distortion caused by the transmitter 1, and/or at receiver interface 7, for measuring the distortion caused by the transmitter 1 and the optical path 5.

When designing an optical link, a reference optical path is provided with all units provided on cabled link fiber 5 between interfaces 3 and 7. A worst case reference distortion parameter is measured for the reference path and provided to the customer with the system. Additional optical components may be inserted into the link 5 later, as long as the measurement at interface 7 indicates acceptable distortion levels.

Figure 2:
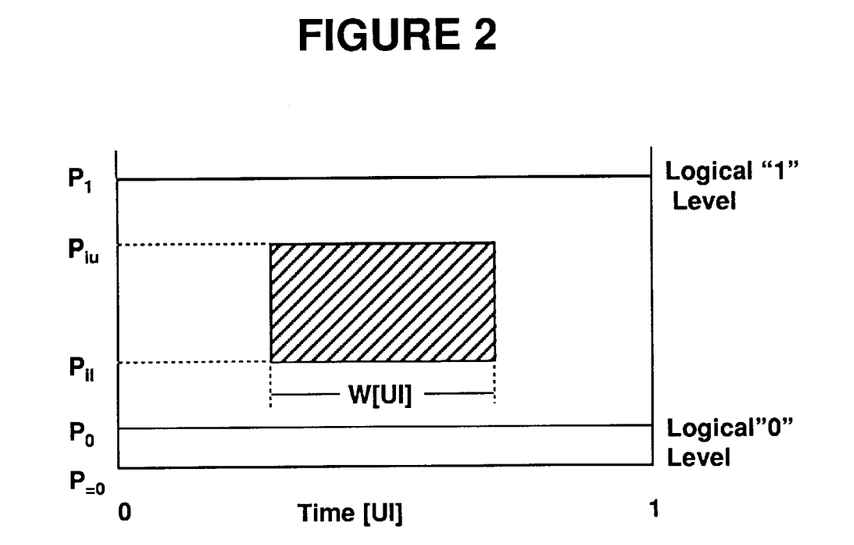
FIG. 2 shows the parameters of the optical eye mask for measurement of distortions according to the invention.
Figure 3:
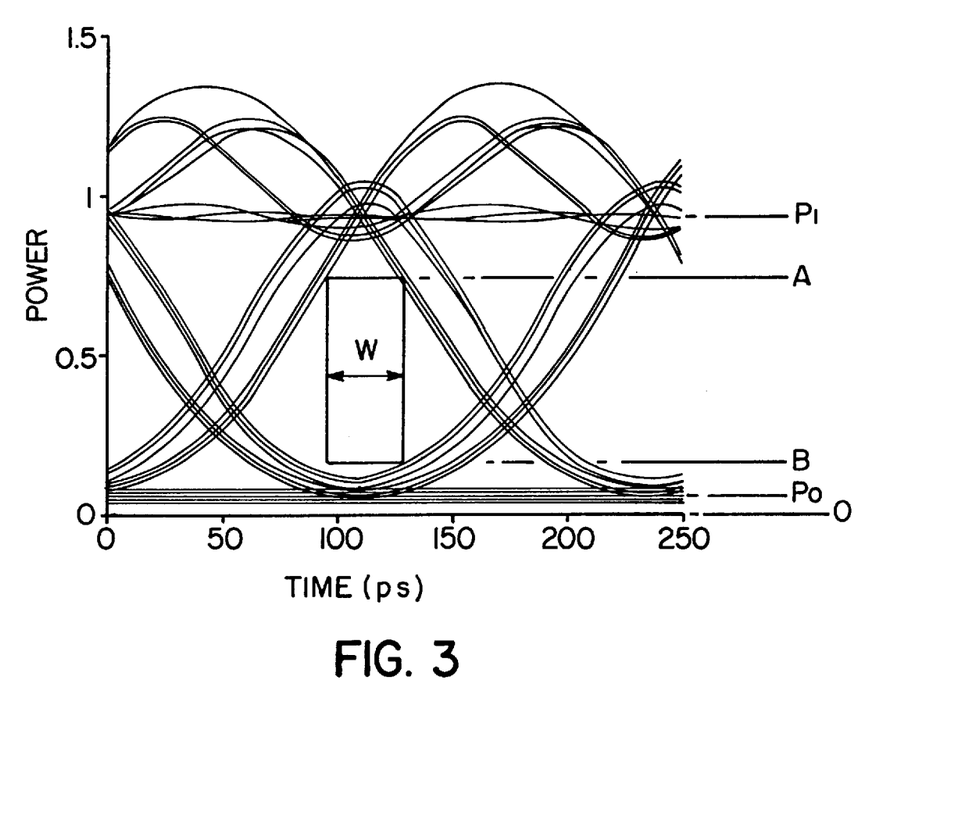
FIG. 3 is the schematic of an optical eye mask mapped onto a measured eye diagram.

FIG. 2 shows the parameters of the eye mask for measurement of distortions according to the invention, and FIG. 3 shows the eye mask mapped onto a measured eye diagram. The vertical coordinate of the eye mask illustrated in FIG. 2 represents optical power, and the horizontal coordinate represents time. $P_1$, $P_0$, $P_{iu}$, $P_{il}$ and $P_{=0}$ are powers associated with long 1's, long 0's, the lowest inner upper level, the highest inner lower level, and zero power level. Optimum sampling phase and slicing level are assumed. The phase window W is a measure of the acceptable phase jitters for a given transmission system and it depends on the transmission equipment specification. $P_{iu}$ and $P_{il}$ levels are determined within the eye diagram for the given W, and they represent the respective lowest and highest levels of the signal power.

Using the definitions in FIG. 2, the average signal power is $$P_{av} = \frac{P_1 + P_0}{2}.$$

Then, the eye mask parameters $P_{iu}$ and $P_{il}$ can be normalized into $$A = \frac{P_{iu}}{2P_{av}} \text{ and } B = \frac{P_{il}}{2P_{av}}.$$

FIG. 3 illustrates an eye mask mapped onto an eye diagram. It is apparent that the inner levels are set for a given phase window W.

Figure 4:
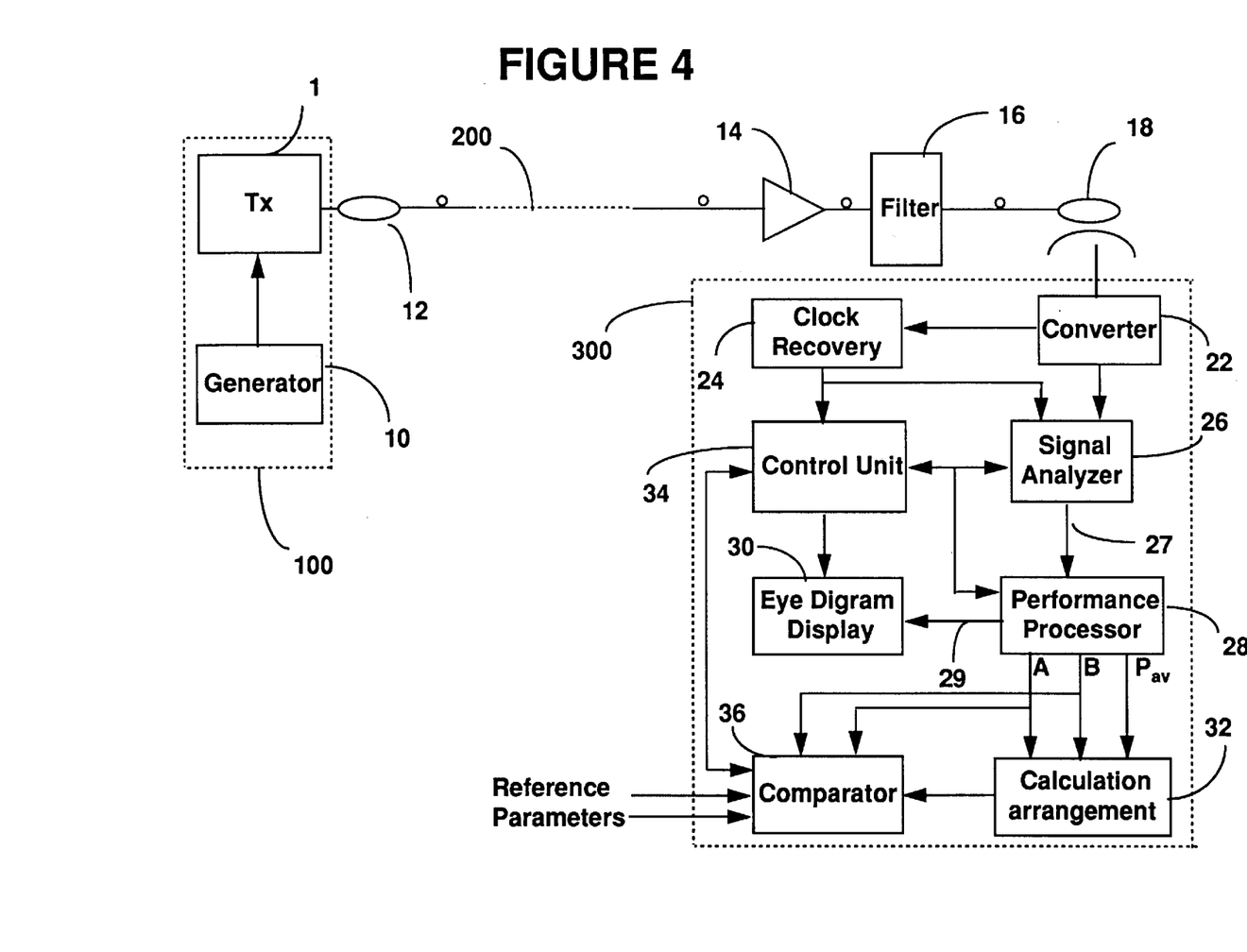
FIG. 4 is a block diagram of the distortion measurement unit of the invention.

FIG. 4 illustrates the measuring system according to the invention. The measuring system generally comprises a transmitter 100, for producing an outgoing optical signal, a reference path 200 between an input tap 12 and an output tap 18, and a distortion measuring unit 300. By specifying distortion eye mask parameters between interfaces 12 and 18, the power penalty due to path distortion is bounded.

Transmitter 100 can be directly modulated (DM) or externally modulated (EM).

An external signal source 10 is illustrated in FIG. 4, which could be a pattern generator producing a pseudo-random bit sequence of order 7 or higher. EM is preferred in dispersive links such as normal fiber at 1550 nm, since the resulting source has a lower linewidth.

The output powers of an EM transmitter 100 is usually less than 0 decibels above one miliwatt (dBm), while that of a DM source is typically less than 3 dBm. These small optical powers limit the distance of the transmission. Therefore, it is preferably to use a post-amplifier in transmitter 1. With post-amplification, the signal power levels launched into the fiber could become much higher and any nonlinearity due to such high launched power can result in significant waveform distortion for high-speed transmissions.

As indicated above, the reference path 200 is assembled in a testing environment using the same components (or similar in performance) with those employed in the tested path 5. In addition, an optical amplifier 14 is cascaded with an optical filter 16 to boost the average level signal at the output tap 18 up to its original level evaluated at the input tap 12. Preferably, optical filter 16 is a 1 nm FWHM Fabry Perot filter with a finesse of order 100.

A distortion measurement unit 300, detects the signal at the output of the reference path 200. Unit 300 may be based on either PIN or ADP detectors. These typically allow receiver sensitivities at OC-192 rate of −14 dBm and −19 dBm, respectively, back-to-back at end of life, for a bit error rate of $10^{-12}$. Overload power at unit 300 should be at least 10 dB higher than that of the guaranteed end of life.

A converter block 22 generally performs conventional amplification and conversion of the optical incoming signal received at output tap 18 to an analog electrical signal, using conventional techniques. For example, a DC coupled high speed PIN diode with a bandwidth larger than 15 GHz may be used in the embodiment of FIG. 4 for signal conversion.

The clock is recovered in clock recovery block 24 and used for synchronization of the blocks of distortion measuring unit 300. The signal output by converter 22 is repetitively processed with an analyzer 26 using the recovered clock. The sampling interval is chosen long enough to remove amplitude and phase noise. The resulting waveform is then processed by performance measuring processor 28 to obtain the distortion parameters A, B and $P_{av}$. To this end, signal 27 is first deconvolved to remove effects of the converter and analyzer transfer functions. Then, the deconvolved waveform is subjected to a SONET filter, such as an appropriately scaled fourth or fifth order Bessel filter, and powers $P_0$, $P_1$, $P_{iu}$ and $P_{il}$ are determined for the given W. Next, processor 28 determines the average power $P_{av}$ and the normalized values A and B.

As well, the resulting filtered waveform 29 is displayed on display 30 and the eye mask parameters are measured on the eye diagram of the signal. This direct measurement on the eye diagram is accurate enough, and the measured eye parameters $P_{av}$, A and B measured on the display 30 may alternatively be used as reference values.

A calculation arrangement block 32 receives parameters $P_{av}$, A and B and calculates receiver sensitivity Q and worse path distortion $D_{WC}$. These reference values are stored at receiver 9 by the manufacturer as provisioned values associated with the respective optical transmission link and optical transmitter. Similarly, the reference value for the transmitter 1 may be measured at interface 3 and stored, so that the performance of the path may be determined independently of the performance of the transmitter.

After the optical equipment has been deployed along path 5, the distortion measurement unit 300 is connected to receiver interface 7 for measuring the tested distortion introduced by the tested path 5. The current values for $P_{av}$, A and B are determined in a similar way for the given phase window W, and compared with the reference parameters, available at receiver 9. The comparison may be effected by applying the reference mask on the eye diagram of the current signal, obtained on display 30, or by comparing parameters A and B with the corresponding reference parameters, in control unit 34 of device 300. The results of the comparison may be used locally, or transmitted to a remote central control.

As indicated above, the distortion eye mask specification between interfaces 3 and 7 bounds transmitter implementation-related distortion and controls the back-to-back sensitivity. It also controls optical path penalty and restricts the relationship between instantaneous phase and intensity of the optical field.

In the presence of signal dependent and signal independent noise at the receiver, with optical distortions, it can be shown that at interface 7 the receiver factor Q is given as:

$$Q = \frac{(A-B)2P_{av}}{\sqrt{\sigma_{ind} + \eta A 2 P_{av}} + \sqrt{\sigma_{ind} + \eta B 2 P_{av}}} \quad (EQ\ 1)$$

where $\sigma_{ind}$ is the signal independent noise and $\eta$ is a multiplication factor, corresponding to the signal dependent noise. In the ideal case of no distortion, B=0 and A=1, in which case the ideal Q factor for the receiver is designated by $Q_0$ and takes the value:

$$Q_0 = \frac{2P_{av}}{\sqrt{\sigma_{ind} + \eta 2 P_{av}} + \sqrt{\sigma_{ind}}} \quad (EQ\ 2)$$

The degradation caused by distortion is defined as follows:

$$D(A,B,x) = \frac{Q}{Q_0} = \frac{A-B}{Y_e} \quad (EQ\ 3)$$

where:

$$Y_e(A,B,x) = \frac{\sqrt{1+xA} + \sqrt{1+xB}}{1 + \sqrt{1+x}} \quad (EQ\ 4)$$

and $$x = \frac{2\eta P_{av}}{\sigma_{ind}} \quad (EQ\ 5)$$

which is the ratio of signal dependent noise to signal independent noise.

Here, D<1 is the distortion factor; $Q_0$ is a distortion free receiver noise limited Q which contains the power dependence of Q. As stated above, Equation 3 may be used to limit the deterioration of system Q.

$Y_e$ is an important parameter which shows the effect of the interaction between distortion and noise. Thus, when the signal independent noise $\sigma_{ind}$ dominates, x=0 and $Y_e$=1, and therefore the degradation of the signal caused by distortion becomes $$D = A - B \quad (EQ\ 6)$$

On the other hand, when the signal dependent noise η dominates, x=∞ and $Y_e=\sqrt{A}+\sqrt{B}$, therefore $$D = \frac{A-B}{\sqrt{A}+\sqrt{B}} \quad (EQ\ 7)$$

In general, since $Y_e$ in EQ 4 is a complicated function of A, B and x, it is useful to find the maximum value of $Y_e$ for all possible values of x:

$$Y_0(A,B)=\text{Max}[Y_e(A,B,x)]|_{x\in(0,\infty)} \quad (EQ\ 8)$$

Therefore, $Y_0 \geq Y_e$ is always satisfied for all A and B combinations. If we replace $Y_e$ by $Y_0$ in EQ. 3, we will obtain:

$$D_{WC}(A,B) = \frac{A-B}{Y_0} \quad (EQ\ 9)$$

Figure 5:
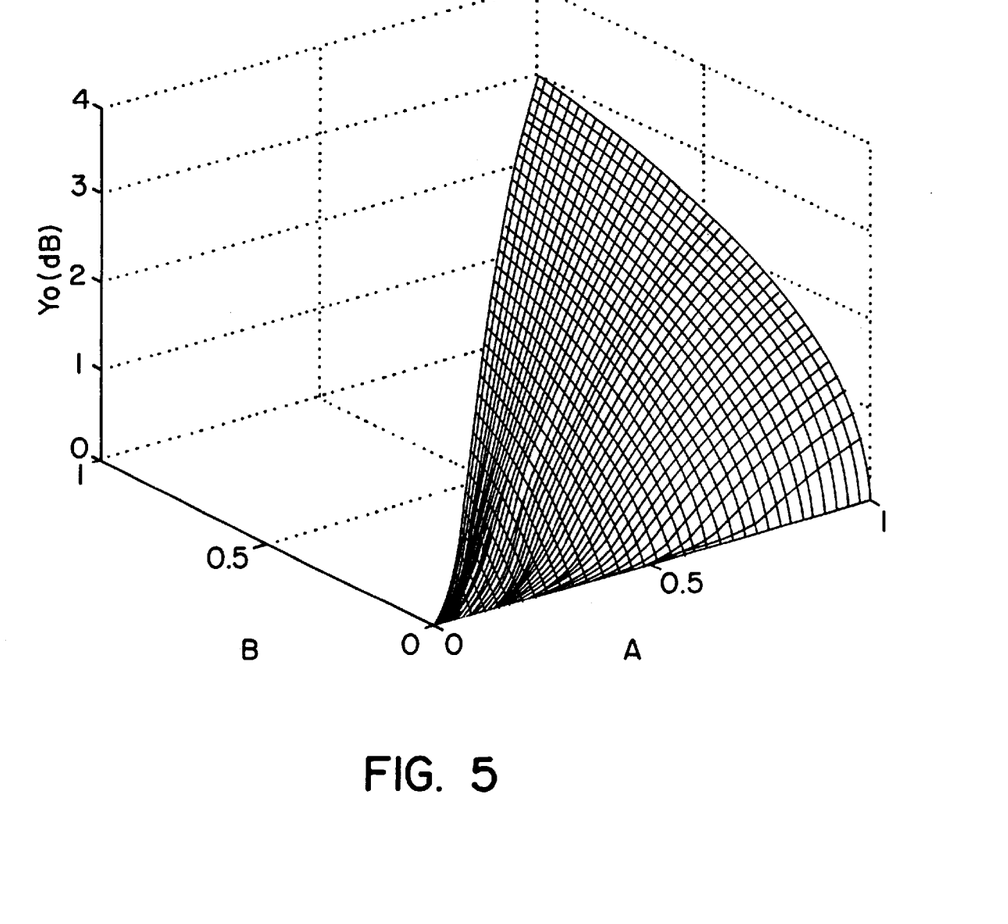
FIG. 5 is a diagram showing the worst case degradation factor $Y_0$ for all possible eyes.

Here, $D_{WC}$ is the worst case distortion parameter, which is independent of noise characteristics. This parameter is calculated in the embodiment of FIG. 4 in calculation arrangement block 32. FIG. 5 shows the $Y_0$ versus eye quality parameters A and B.

In order to determine the maximum of $Y_0(A,B,x)$, the solution for variable x in Equation 4 is calculated by determining the derivative of $Y_e(A,B,x)$. This gives one solution at $$x_0 = \frac{(1-A-B)}{AB},$$

with $$Y_e(A,B,x_0) = \frac{\sqrt{A}\sqrt{1-A}+\sqrt{B}\sqrt{1-B}}{\sqrt{AB}+\sqrt{1-A}\sqrt{1-B}}$$

It is proven that whenever $\sqrt{A}+\sqrt{B} \geq 1$, $Y_e(A,B,x_0) \leq \sqrt{A}+\sqrt{B}$, is always satisfied and thus $Y_e(A,B,x_0)$ must be a local minimum. Therefore, $Y_e(A,B)=\sqrt{A}+\sqrt{B}$ is the global maximum when $\sqrt{A}+\sqrt{B} \geq 1$. On the other hand, it is also easy to prove that when $\sqrt{A}+\sqrt{B} \leq 1$, we always have $Y_e(A,B,x_0) \leq 1$. As we already know that the maximum $Y_e$ value can never be less than 1 (at x=0), we can obtain the following simplified formula for $Y_0$:

$$Y_0 = \begin{cases} \sqrt{A}+\sqrt{B} & (\sqrt{A}+\sqrt{B}) > 1 \\ 1 & (\sqrt{A}+\sqrt{B}) < 1 \end{cases} \quad (EQ\ 10)$$

Figure 6:
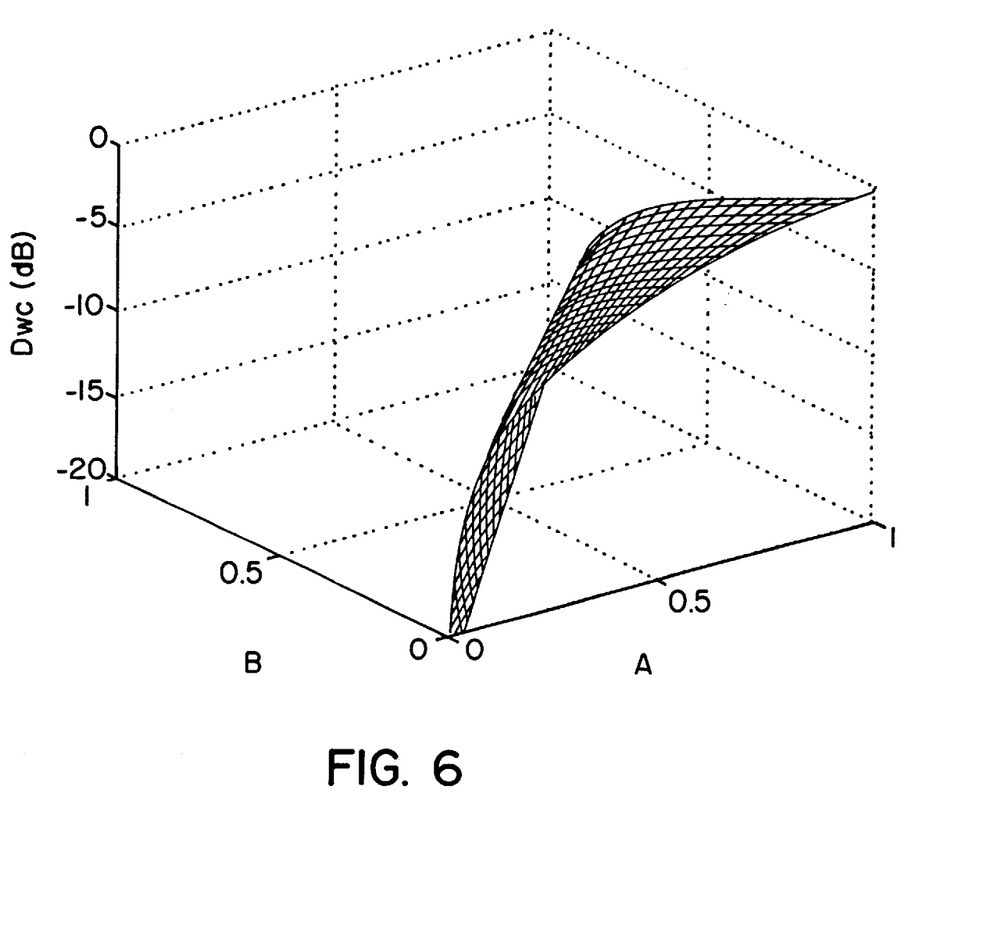
FIG. 6 is a diagram of the Q distortion factor versus eye parameters A and B.

In fact, this equation fits Equation 8. FIG. 6 illustrates the variation of the Q degradation factor $D_{WC}$ as defined in Equation 9 versus eye parameters A and B.

Figure 7:
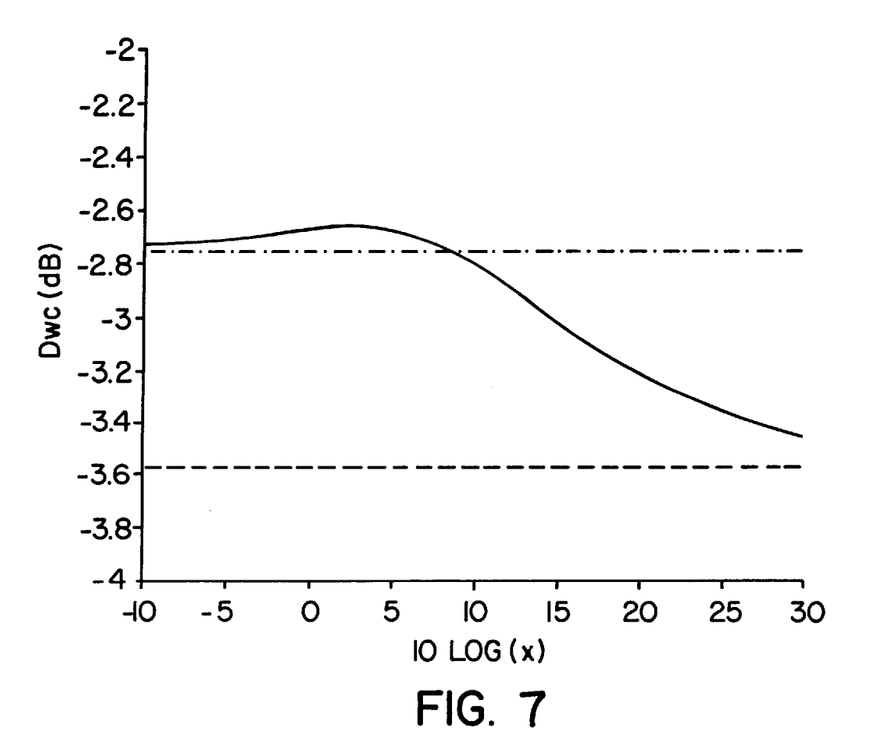
FIG. 7 shows the variation of the degradation parameter ($D_{WC}$) for the signal independent noise (A–B), signal dependent noise ($A^{1/2}+B_{1/2}$), and the ratio of the signal dependent noise to the signal independent noise (x), for the 2-span system.

Next, the receiver degradation parameter $D_{WC}$ may be calculated as a function of x and this is shown by the solid line in FIG. 7. The dashed line is $10\lg(A^{1/2}+B^{1/2})$, which equals to $D_{WC}$ when x approaches infinit. In fact, $D_{WC}(x)$ approaches the limit for x=∞ quite slowly. The dash-dotted line in FIG. 7 is $10\lg(A-B)$ which represents the case where the signal independent noise dominates, namely when x=0.

Figure 8:
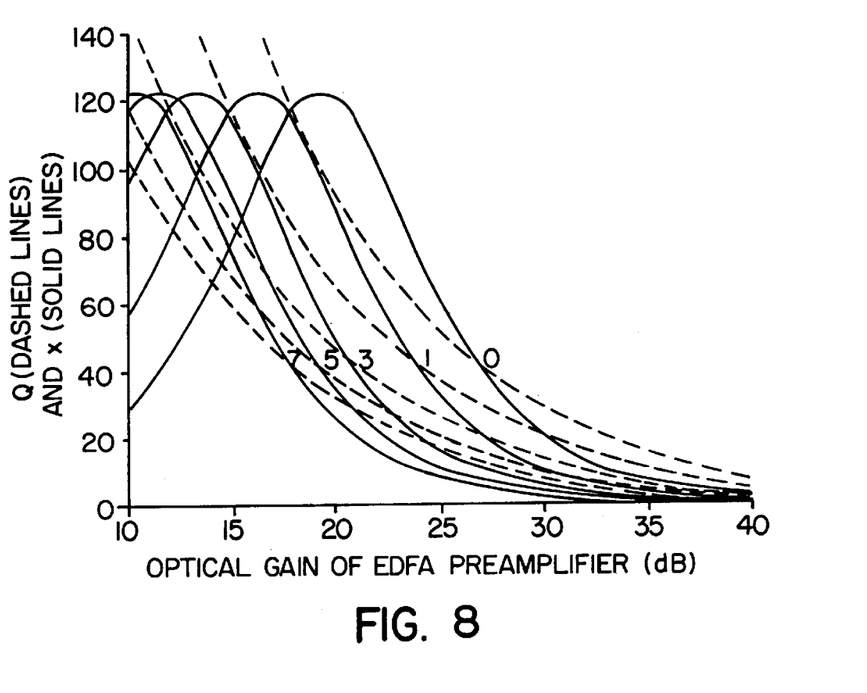
FIG. 8 illustrates the variation of (x) and receiver Q as a function of preamplifier optical gain in an OC-192 optical amplified system and also a function of the number of fiber spans.

To evaluate the worst case x value possible, FIG. 8 shows both system Q value (dashed line) and x (solid line) as functions of EDFA preamplifier gain for multi-span OC-192 optical systems with the number of spans indicated. A bandwidth of 1.5 nm is assumed for the receiver optical fiber, and an EDFA noise figure of F=6 dB. The output optical power of the EDFA preamplifier is fixed at 1 mW and the receiver thermal noise is 15 ps/sqrt(Hz). The maximum x is approximately 125 as shown in FIG. 8 and this value depends mainly on the receiver thermal noise level. However, in practical cases, the range of Q values of interest includes Q less than 30, the maximum x values are all around 22.5 irrespective of the number of spans.

Figure 9:
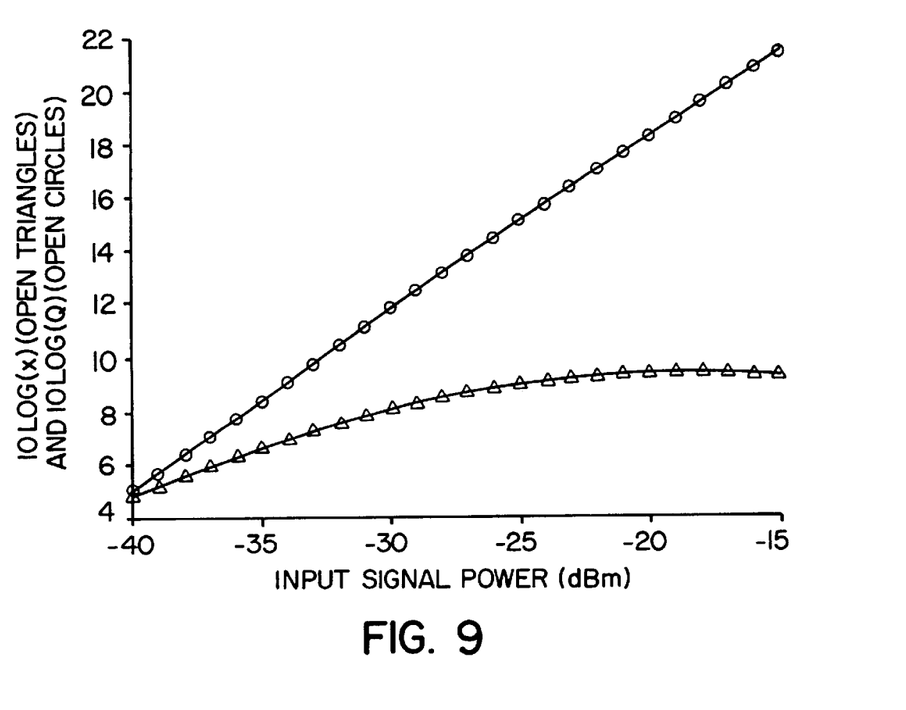
FIG. 9 shows the variation of (x) and receiver (Q) as a function of input power of the optical signal in an OC-48 APD receiver.

The maximum x value for the APD optical receiver is shown in FIG. 9. The reason for the low value is that there is no signal-spontaneous beat noise as in EDFA preamplified optical receivers. The maximum x is less than 10 in this OC-48 optical receiver. The x value for the PIN optical receiver is even lower than for the APD receivers, because the receiver thermal noise is usually much higher than the shot noise.

From the above analysis an x=30 value is a safe limitation for most of the practical optical systems and thus Equation 8 becomes:

$$Y_0(A,B)=\text{Max}[Y_e(A,B,x)]|_{x\in(0,30)} \quad (EQ\ 11)$$

While Equation 10 is relatively simple and guarantees a fair evaluation of system performance, it overestimates the level of degradation by typically 0.35 dB in practically all cases. On the other hand, Equation 11 is less stringent than Equation 10, but is more complicated to calculate. The decision as to which of these equations should be used may be based on the practical application.

For quick reference, Tables 1 and 2 provide $Y_0$ values calculated with Equations 10 and 11, respectively. The corresponding Q degradation $D_{WC}$ caused by the eye distortion calculated by Equation 9 with Equations 10 and 11 are given in Tables 3 and 4, respectively. The difference in the results by using different equations can be noted from these tables.

TABLE 2

$Y_0$ calculated with EQ. 11 with the maximum x = 30

| A/B | 0 | 0.1 | 0.2 | 0.3 | 0.4 | 0.5 | 0.6 | 0.7 | 0.8 | 0.9 | 1.0 |
|---|---|---|---|---|---|---|---|---|---|---|---|
| 0 | | | | | | | | | | | |
| 0.1 | 1.00 | | | | | | | | | | |
| 0.2 | 1.00 | 1.00 | | | | | | | | | |
| 0.3 | 1.00 | 1.00 | 1.00 | | | | | | | | |
| 0.4 | 1.00 | 1.00 | 1.00 | 1.03 | | | | | | | |
| 0.5 | 1.00 | 1.00 | 1.01 | 1.09 | 1.16 | | | | | | |
| 0.6 | 1.00 | 1.00 | 1.07 | 1.15 | 1.21 | 1.27 | | | | | |
| 0.7 | 1.00 | 1.02 | 1.12 | 1.20 | 1.26 | 1.32 | 1.38 | | | | |
| 0.8 | 1.00 | 1.07 | 1.16 | 1.24 | 1.31 | 1.37 | 1.42 | 1.48 | | | |

TABLE 2-continued $Y_0$ calculated with EQ. 11 with the maximum x = 30

| A/B | 0 | 0.1 | 0.2 | 0.3 | 0.4 | 0.5 | 0.6 | 0.7 | 0.8 | 0.9 | 1.0 |
|---|---|---|---|---|---|---|---|---|---|---|---|
| 0.9 | 1.00 | 1.11 | 1.21 | 1.29 | 1.35 | 1.41 | 1.47 | 1.52 | 1.57 | | |
| 1 | 1.00 | 1.15 | 1.25 | 1.33 | 1.40 | 1.46 | 1.51 | 1.56 | 1.61 | 1.65 | |

TABLE 1

$Y_0$ calculated with EQ. 10

| A/B | 0 | 0.1 | 0.2 | 0.3 | 0.4 | 0.5 | 0.6 | 0.7 | 0.8 | 0.9 | 1.0 |
|---|---|---|---|---|---|---|---|---|---|---|---|
| 0 | | | | | | | | | | | |
| 0.1 | 1.00 | | | | | | | | | | |
| 0.2 | 1.00 | 1.00 | | | | | | | | | |
| 0.3 | 1.00 | 1.00 | 1.00 | | | | | | | | |
| 0.4 | 1.00 | 1.00 | 1.08 | 1.18 | | | | | | | |
| 0.5 | 1.00 | 1.02 | 1.15 | 1.25 | 1.34 | | | | | | |
| 0.6 | 1.00 | 1.09 | 1.22 | 1.32 | 1.41 | 1.48 | | | | | |
| 0.7 | 1.00 | 1.15 | 1.28 | 1.38 | 1.47 | 1.54 | 1.61 | | | | |
| 0.8 | 1.00 | 1.21 | 1.34 | 1.44 | 1.53 | 1.60 | 1.67 | 1.73 | | | |
| 0.9 | 1.00 | 1.26 | 1.40 | 1.50 | 1.58 | 1.66 | 1.72 | 1.79 | 1.84 | | |
| 1 | 1.00 | 1.32 | 1.45 | 1.55 | 1.63 | 1.71 | 1.77 | 1.84 | 1.89 | 1.95 | |

TABLE 3

$D_{wc}$ (dB) calculated using EQ. 10 and EQ. 9

| A/B | 0 | 0.1 | 0.2 | 0.3 | 0.4 | 0.5 | 0.6 | 0.7 | 0.8 | 0.9 | 1.0 |
|---|---|---|---|---|---|---|---|---|---|---|---|
| 0 | | | | | | | | | | | |
| 0.1 | −10.0 | | | | | | | | | | |
| 0.2 | −6.99 | −10.0 | | | | | | | | | |
| 0.3 | −5.23 | −6.99 | −10.0 | | | | | | | | |
| 0.4 | −3.98 | −5.23 | −7.32 | −10.7 | | | | | | | |
| 0.5 | −3.01 | −4.08 | −5.85 | −7.98 | −11.3 | | | | | | |
| 0.6 | −2.22 | −3.39 | −4.85 | −6.44 | −8.47 | −11.7 | | | | | |
| 0.7 | −1.55 | −2.84 | −4.10 | −5.39 | −6.90 | −8.88 | −12.1 | | | | |
| 0.8 | −0.97 | −2.38 | −3.49 | −4.60 | −5.82 | −7.27 | −9.21 | −12.4 | | | |
| 0.9 | −0.46 | −1.99 | −3.00 | −3.97 | −5.00 | −6.17 | −7.59 | −9.51 | −12.7 | | |
| 1 | 0 | −1.65 | −2.57 | −3.45 | −4.35 | −5.33 | −6.47 | −7.87 | −9.76 | −12.9 | |

TABLE 4

$D_{wc}$ (dB) calculated using EQ. 11 and EQ. 9 with the maximum x = 30

| A/B | 0 | 0.1 | 0.2 | 0.3 | 0.4 | 0.5 | 0.6 | 0.7 | 0.8 | 0.9 | 1.0 |
|---|---|---|---|---|---|---|---|---|---|---|---|
| 0 | | | | | | | | | | | |
| 0.1 | −10.0 | | | | | | | | | | |
| 0.2 | −6.99 | −10.0 | | | | | | | | | |
| 0.3 | −5.23 | −6.99 | −10.0 | | | | | | | | |
| 0.4 | −3.98 | −5.23 | −6.99 | −10.1 | | | | | | | |
| 0.5 | −3.01 | −3.98 | −5.28 | −7.37 | −10.6 | | | | | | |
| 0.6 | −2.22 | −3.01 | −4.26 | −5.82 | −7.83 | −11.1 | | | | | |
| 0.7 | −1.55 | −2.30 | −3.49 | −4.76 | −6.24 | −8.21 | −11.4 | | | | |
| 0.8 | −0.97 | −1.83 | −2.88 | −3.95 | −5.15 | −6.60 | −8.53 | −11.7 | | | |
| 0.9 | −0.46 | −1.42 | −2.37 | −3.31 | −4.33 | −5.49 | −6.90 | −8.81 | 12.0 | | |
| 1 | 0 | −1.07 | −1.94 | −2.79 | −3.67 | −4.64 | −5.77 | −7.17 | −9.06 | −12.2 | |

The equivalence between relative changes in Q (in dBQ) and the receiver power penalty (in dB) may additionally be used as a means for determining acceptable levels distortion. In particular:

$$R_x \cdot \text{Penalty } (dB) = -10\log(D_{wc}) \quad \text{(EQ 12)}$$

where the value of the factor $R_x$ is between 1 and 0.5, depending upon receiver optoelectronics. For example, for a PIN diode where signal independent noise is important, $R_x$ is approximately 1, and for an APD where signal dependent noise is important, $R_x$ is approximately 0.6. More detailed ranges are provided in Table 5. These factors may be applied to the build up of optical noise and distortion budget of a complex system.

TABLE 5

| Parameter | Max | Min |
| --- | --- | --- |
| PIN $R_x$ Factor | 1 | 0.9 |
| APD $R_x$ Factor | 0.7 | 0.55 |

Figure 10:
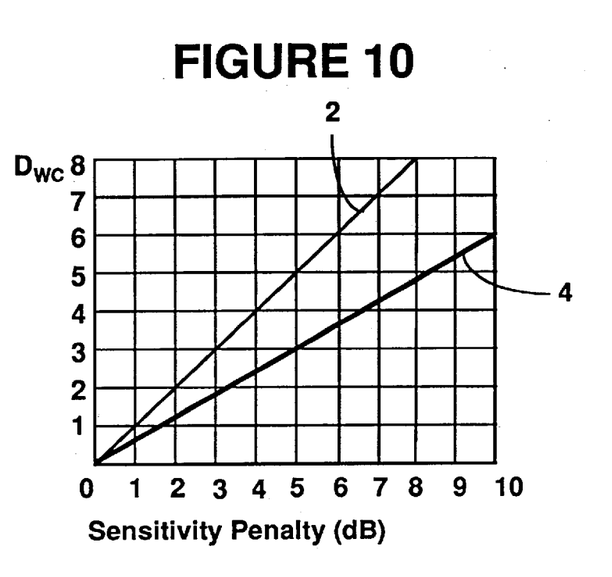
FIG. 10 shows the relationship between $D_{WC}$ and the sensitivity penalty for PIN and ADP receiver technologies.

FIG. 10 displays the relationship between eye mask distortion, $D_{WC}$ and the sensitivity penalty as a function of receiver type. The curves are based upon a distortion free receiver ($Q_0$) for PIN and ADP receivers. The origin of the graphs correspond to the sensitivities at which the distortion-free receivers have Q of 7.03 for a bit error rate (BER) of $10^{-12}$.

Figure 11A:
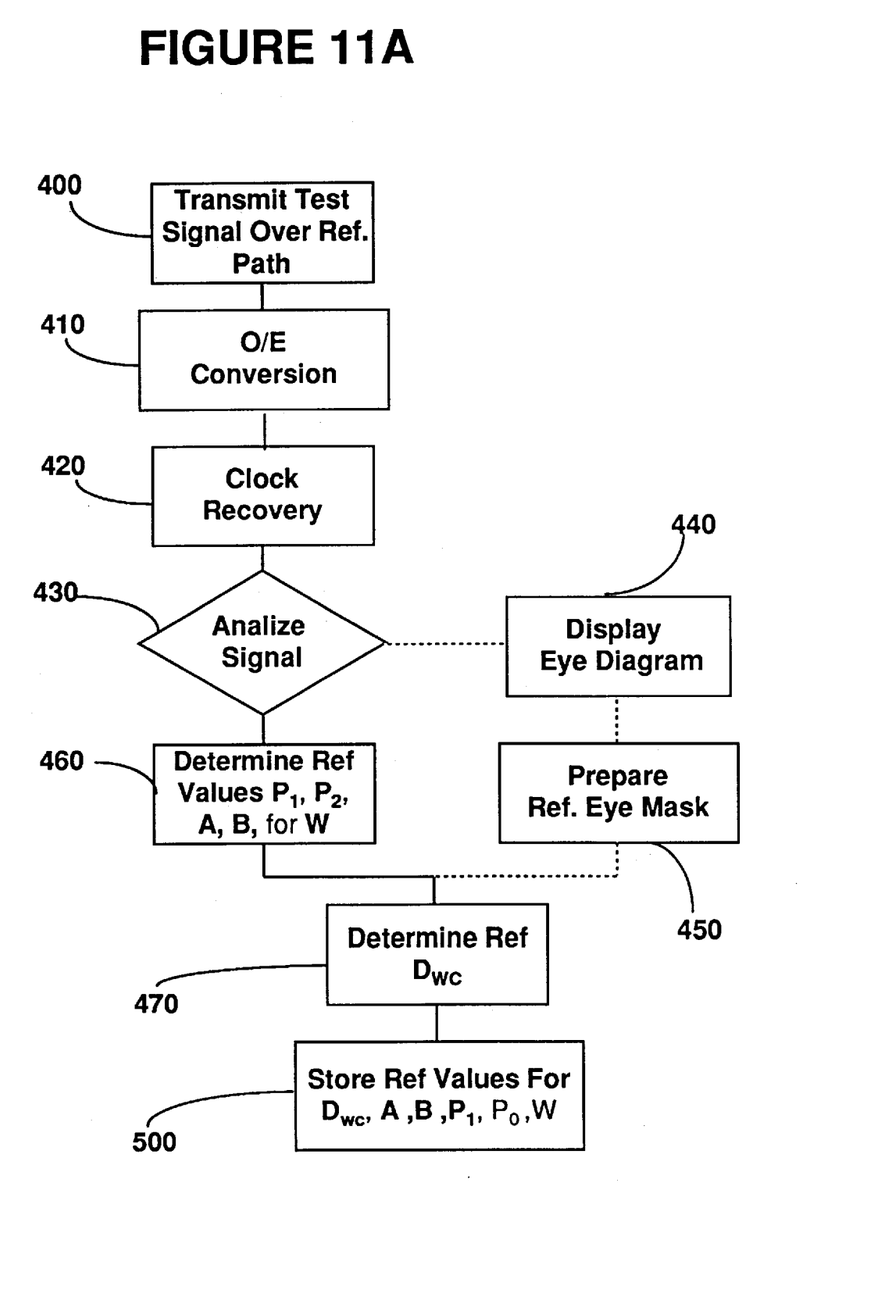
FIG. 11A is a flowchart illustrating the method for measuring the distortion of a reference signal.
Figure 11B:
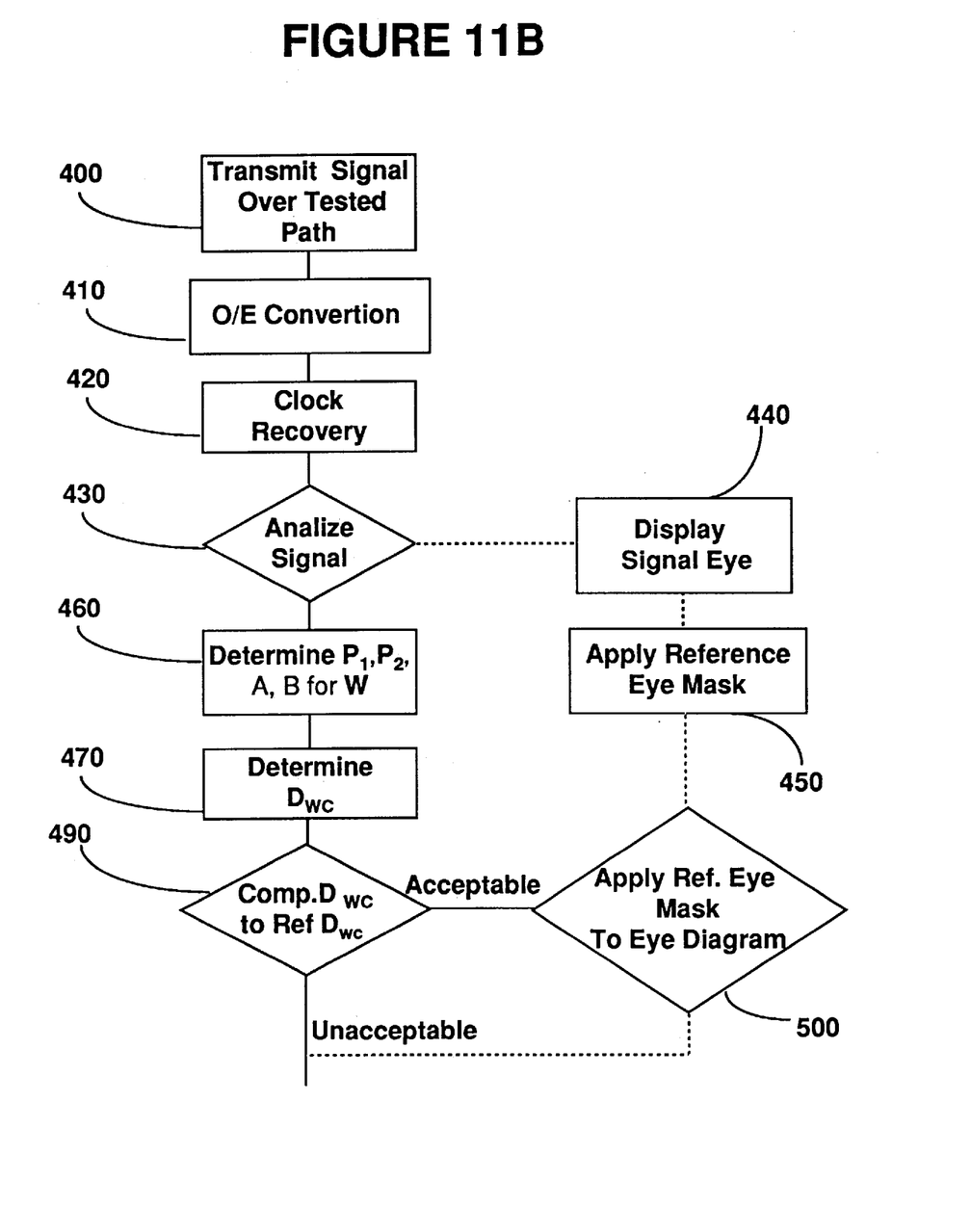
FIG. 11B is a flowchart illustrating the method for measuring the distortion of a tested signal.

FIGS. 11A and 11B show the flow charts of the method of measuring the distortion of an optical link according to the invention. FIG. 11A shows the method for measuring the distortion of a reference signal, and FIG. 11B shows the method for measuring the distortion of a tested signal; therefore steps 400 to 450 are similar for the two flow-charts. FIG. 11A illustrates at step 400 that transmitter 100 launches an optical signal along reference path 200 to distortion measurement unit 300. The signal is received and converted to an electrical signal in step 410 and the clock is recovered in step 420. Next, the reference eye mask parameters are measured on the eye diagram in steps 440 and 450, or electronically in step 460. The reference worst case distortion factor value $D_{WC}$ is determined in step 470 and stored at the receiver in step 480, together with the reference parameters A, B, $P_1$, $P_0$, and W. A reference eye mask for the corresponding transmission link may also be provisioned with the system.

After the transmission link has been deployed, a similar measurement is performed at interface 7. In step 450, the reference eye mask is applied on the eye diagram of the received signal. If the mask fits into the eye diagram, the distortion of the signal is within acceptable limits, as determined in step 500. The distortion factor D is calculated electronically in step 470 or using the measured parameters A, B and then compared with the provisioned $D_{WC}$ in step 490. As indicated above, depending on the point of measurement, the results of the comparison indicate the condition of the tested path and/or of the transmitter.

While the invention has been described with reference to particular example embodiments, further modifications and improvements which will occur to those skilled in the art, may be made within the purview of the appended claims, without departing from the scope of the invention in its broader aspect.

What is claimed is:

1. A method for measuring distortion in an optical transmission system comprising the steps of:

transmitting an outgoing optical signal from a transmitter to a point of measurement defined downstream from said transmitter;

receiving, at a distortion measuring unit connected to said point of measurement, an incoming optical signal which is a degraded variant of said outgoing optical signal;

converting said incoming optical signal to an electrical signal, recovering a clock signal from said electrical signal;

generating an eye diagram of said electrical signal;

mapping a reference eye mask into said eye diagram; and establishing that the distortion of said outgoing optical signal is acceptable whenever said reference eye mask fits into said eye diagram.

2. A method as claimed in claim 1, wherein said point of measurement is defined at the optical connection plane of said transmitter for measuring the distortion of said transmitter.

3. A method as claimed in claim 1, wherein said point of measurement is defined at the optical connection plane of a receiver for measuring the distortion of said transmitter and of an optical path between said transmitter and said receiver.

4. A method as claimed in claim 1, further comprising measuring a distortion parameter including:

determining on said eye diagram a first power level ($P_1$) representing the level for a long succession of symbols "1", and a second power level representing the level for a long succession of symbols "0";

determining on said eye diagram a lowest inner upper power level ($P_{iu}$) and a highest inner lower power level ($P_{il}$) for an admissible phase window (W) expressed in absolute time units; and determining an upper value (A) and a lower value (B), representing the normalized values for said lowest inner upper power level ($P_{iu}$), and said lowest inner upper power level (Piu) respectively, with respect to said first and second power levels.

5. A method as claimed in claim 4, further comprising:

establishing a reference eye mask having as a horizontal side said phase window (W) and as the vertical side the difference between said upper value (A) and said lower value (B); and providing said reference eye mask at said point of measurement.

6. A method as claimed in claim 4, further comprising the steps of determining a worst case distortion factor derived from said upper and lower values, which is independent of noise.

7. A method as claimed in claim 1, wherein said step of generating comprises the substeps of:

selecting a sampling interval ($T_s$) to be relatively large in comparison with the interval (T) between two successive symbols of said electrical signal; and forming said eye diagram by repetitively processing said electrical signal during said sampling interval ($T_s$) using said recovered clock.

8. A method for measuring distortion in an optical transmission system comprising the steps of:

defining a reference path which simulates an optical live path to be tested;

launching an outgoing optical signal on said reference path from a test transmitter and receiving at a distortion measuring unit an incoming optical signal which is a degraded variant of said outgoing optical signal;

converting said incoming optical signal to an electrical signal, recovering a clock signal from said electrical signal;

selecting a sampling interval ($T_s$) to be relatively large in comparison with the interval (T) between two successive symbols of said electrical signal and repetitively processing said electrical signal during said sampling interval using said clock signal;

establishing a reference eye diagram of said electrical signal and determining on said eye diagram a first power level ($P_1$) representing the level for the long "1"s, and a second power level representing the level for the long "0"s;

determining on said eye diagram a lowest inner upper power level ($P_{iu}$) and a highest inner lower power level ($P_{il}$) for an admissible phase window (W) expressed in absolute time units;

determining an upper value (A) and a lower value (B), representing the normalized values for said lowest inner upper power level (Piu) and said highest inner lower power level (Pil) respectively, with respect to said first and second power levels;

preparing said eye mask as a rectangle with a first side representing said phase window (W) and a second side representing the difference between said upper value (A) and said lower value (B); and provisioning said reference eye mask at a point of measurement at the output of said live path.

9. A method as claimed in claim 8, further comprising:

determining a distortion factor which is independent of noise;

comparing said distortion factor with a worst case distortion factor provisioned at said point of measurement; and declaring the distortion unacceptable when said distortion factor is greater than said worst case distortion factor.

10. A method as claimed in claim 9, wherein said distortion factor is determined according to the relationship:

$$D_{WC}(A,B) = \frac{A-B}{Y_0}$$

where $Y_0(A,B) = \text{Max}[Y_e(A,B,x)]_{x \in (0, x_{max})}$, $$Y_e(A,B,x) = \frac{\sqrt{1+xA} + \sqrt{1+xB}}{1 + \sqrt{1+x}},$$

and $X_{MAX}$ is a user selected value.

11. A distortion measurement unit for measuring a performance parameter of an optical transmission link, comprising:

a converter for converting an incoming optical signal to a digital electrical signal;

a clock recovery unit for recovering a clock signal from said digital electrical signal;

a signal analyzer for receiving said digital electrical signal and said dock signal and producing a broadband analog waveform;

a performance processor for receiving said broadband analog waveform, reforming same, and determining a distortion parameter for a preset phase window (W);

a control unit for supervising said converter, said clock recovery unit, said signal analyzer and said performance processor.

12. A device as claimed in claim 11, further comprising a display for receiving said clock signal and said waveform over a sampling interval relatively large in comparison with the interval between two successive symbols of said digital electrical signal and displaying an eye diagram averaged to reduce noise impact.

13. A device as claimed in claim 11, further comprising a calculation arrangement for receiving an upper value (A), a lower value (B), and an average power level $P_{av}$ from said performance processor and determining a worst case distortion parameter, which is independent of noise.

14. A device as claimed in claim 13, wherein said performance processor comprises a fourth order Bessel filter.

15. A device as claimed in claim 11, wherein said performance processor comprises means for compensating for the distortion introduced into said input electrical signal by said converter and said signal analyzer.

16. A device for measuring distortion of an optical link comprising:

a test modulator for generating a pseudo-random bit sequence (PRBS) of order 7 or higher and modulating a transmitter with said (PRBS);

a reference path comprising all units of said optical link operating at the respective field parameters; and a distortion measurement unit, including:

means for converting a degraded variant of said PRBS to a digital signal synchronized with said PRBS;

means for processing said digital signal to obtain an analog broadband waveform; and means for generating an eye averaged diagram of said analog broadband waveform using a sampling interval relatively large in comparison to the interval between two successive symbols of said digital signal.

17. A device as claimed in claim 16, further comprising an optical amplifier provided in said reference path upstream from said point of measurement for amplifying said incoming optical signal at a level substantially equal to the level of said outgoing optical signal.

18. A device as claimed in claim 17, further comprising an optical filter placed between said optical amplifier and said point of measurement for filtering the ASE noise introduced by said optical amplifier.

19. A method for measuring distortion of an optical link comprising:

generating a pseudo-random bit sequence (PRBS) of order 7 or higher and modulating a transmitter with said (PRBS);

providing a reference path comprising all units of said optical link operating at the respective field parameters;

connecting a distortion measurement unit successively to the output of said transmitter directly and through said reference path for determining a first set of distortion parameters characterizing said transmitter and a second set of distortion parameters characterizing said reference path;

deploying said optical path in the field;

in the field, connecting said distortion measurement unit to the output of said optical path and determining a third set of distortion parameters characterizing said optical path in operation; and comparing said third set of parameters with said second set of parameters to determine if the distortion introduced by said optical path after installation is acceptable.

20. A method for measuring distortion in an optical transmission system comprising the steps of:

transmitting an outgoing optical signal from a transmitter to a point of measurement defined downstream from said transmitter;

receiving, at a distortion measuring unit connected to said point of measurement, an incoming optical signal which is a degraded variant of said outgoing optical signal;

converting said incoming optical signal to an electrical signal, and recovering a clock signal from said electrical signal;

generating an eye diagram of said electrical signal;

averaging said eye diagram over a sampling period of time to reduce the impact of noise on the distortion; and measuring a distortion parameter on said averaged eye diagram.

* * * * *